United States Patent [19]

Pannbacker

[11] Patent Number: 4,740,041
[45] Date of Patent: Apr. 26, 1988

[54] ANTI-LOCKING BRAKE CONTROL SYSTEM FOR MOTOR VEHICLES

[75] Inventor: Helmut Pannbacker, Hemmingen, Fed. Rep. of Germany

[73] Assignee: WABCO Westinghouse Fahrzeugbremsen GmbH, Hanover, Fed. Rep. of Germany

[21] Appl. No.: 888,893

[22] Filed: Jul. 22, 1986

[30] Foreign Application Priority Data

Jul. 25, 1985 [DE] Fed. Rep. of Germany ....... 3526559

[51] Int. Cl.⁴ .......................... B60T 8/64; B60T 13/68
[52] U.S. Cl. .................................. 303/119; 303/110; 303/118
[58] Field of Search ........................ 303/93, 94, 95, 96, 303/97, 103, 106, 110, 111, 113, 118, 119; 137/102

[56] References Cited

U.S. PATENT DOCUMENTS

| | | | |
|---|---|---|---|
| 3,866,983 | 2/1975 | Kondo | 303/119 |
| 4,035,034 | 7/1977 | Sekiguchi | 303/119 |
| 4,155,603 | 5/1979 | Harries | 303/119 |
| 4,175,795 | 11/1979 | Mortimer et al. | 303/113 |
| 4,313,166 | 1/1982 | Rode et al. | |
| 4,460,220 | 7/1984 | Petersen | 303/119 |

FOREIGN PATENT DOCUMENTS

| | | | |
|---|---|---|---|
| 3026254 | 2/1982 | Fed. Rep. of Germany. | |
| 2057080 | 3/1981 | United Kingdom | 303/119 |

OTHER PUBLICATIONS

WABCO Anti-Skid System brochure sent 1981.

Primary Examiner—Andres Kashnikow
Assistant Examiner—Timothy Newholm
Attorney, Agent, or Firm—G. J. Falce

[57] ABSTRACT

An anti-locking braking control system in which each one of at least two wheels of an axle provides a speed signal for use by a respective control channel of an electronic control unit having "modified individual wheel control" logic. A pair of control valves are connected in series to regulate the respective wheel brake pressure to obtain a "select-low wheel control" mode, the "individual wheel control" logic of the control channels assuring that the series-connected control valves are operated synchronously when reapplication of braking pressure is called for by a respective control channel.

6 Claims, 2 Drawing Sheets

ANTI-LOCKING BRAKE CONTROL SYSTEM FOR MOTOR VEHICLES

BACKGROUND OF THE INVENTION

The present invention relates to an anti-locking brake system for a motor vehicle.

Anti-locking brake systems prevent locking of the vehicle wheels under conditions of poor road adhesion and/or panic brake response by the driver, in order to maintain steerability of the vehicle and to achieve optimum stopping distance.

Different types of anti-locking brake systems are known, the so-called "individual wheel control" system is the most efficient, in that there is a control channel with a speed sensor and control valve assigned to each wheel. Thus, only the wheel that is detected as slipping is controlled by the anti-locking system, so that the non-slipping wheels are able to continue to provide braking effort to achieve the shortest possible stopping distance. Such a system is disclosed in German Patent DE-OS No. 30 26 254 (FIG. 1).

A disadvantage of "individual wheel control" anti-locking brake systems, however, is the occurrence of yaw or differential steering forces when braking is performed on a road with different coefficients of friction. These steering forces must be compensated by the driver through appropriate countersteering actions. Under poor conditions, such maneuvers can be extremely difficult.

For this reason, a "modified individual wheel control" anti-locking brake system has been developed, which is essentially similar to the "individual wheel control" system, but in which the differences in brake force between the two wheels of a common axle do not exceed a predetermined value. An example of such a "modified individual wheel control" system is disclosed in U.S. Pat. No. 4,313,166, incorporated herein by reference. With a "modified individual wheel control" system, the reapplication of braking pressure for the respective wheels of an axle occurs concurrently and the steering counter forces required to correct the yaw moments are considerably reduced.

Another type of known anti-locking brake control system is the "select-low control" system, in which the same brake pressure is released for both wheels of a given axle via a common control valve. Each wheel is arranged with a speed sensor. The corresponding electronic system controls the common regulation valve as a function of the dynamic condition of whichever wheel is running on the lower coefficient of friction road surface. The other wheel running on the higher coefficient of friction road surface is synchronously co-controlled with the wheel having the lower coefficient of friction, and is thus generally underbraked. While such an arrangement has the advantage of providing especially good lateral stability and steering control, particularly on road surfaces having laterally different coefficients of friction, the arrangement has the disadvantage or a longer braking distance.

The anti-locking brake system of the prior art, as shown in German Patent DE No. 30 26 254 (FIGS. 2 and 4), from which the present invention proceeds, exhibits an electronic control system that provides "individual wheel control," but where the regulating valves that control the braking pressure of the respective wheels of a given axle operate via a common multi-way valve that selects the regulating valve of the wheel running on the road surface having the lower adhesion level. In this manner, a "select-low control" characteristic is achieved for this axle using an electronic control system for "individual wheel control," which is desirable in certain cases. A disadvantage of this solution of the prior art lies in the expense incurred for the additional multi-way valve.

SUMMARY OF THE INVENTION

The object of the present invention, therefore, is to provide a "select-low control" characteristic for an anti-locking brake system, with an electronic control system arranged to provide "individual wheel control" without incurring any added expense for a multi-way selector valve. Briefly, this objective is achieved by arranging the brake pressure regulating valves of the respective wheels of a given axle in series with each other and employing an electronic control system of the previously discussed "modified individual control" type, thereby achieving the desired "select-low control" characteristic without requiring an additional multi-way selector valve, as required in the afore-mentioned prior art arrangement.

BRIEF DESCRIPTION OF THE DRAWINGS

The foregoing objective and further advantages of the present invention will become apparent from the following more detailed explanation, when taken in conjunction with the accompanying drawings in which.

DESCRIPTION AND OPERATION

Figure 1:
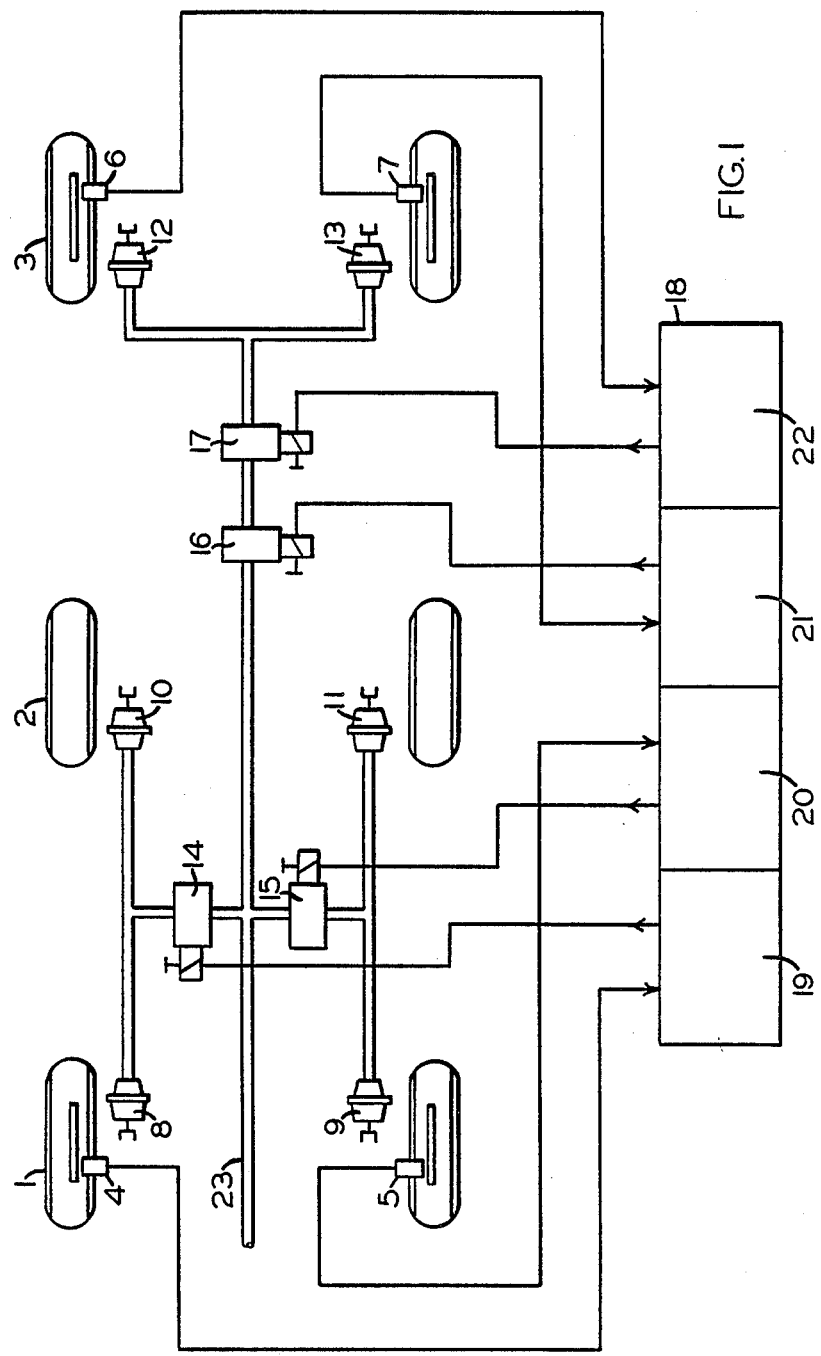
FIG. 1 is a system schematic of a three-axle trailer of a motor vehicle having a four-channel anti-locking brake system, which, in accordance with the invention, achieves a "select-low control" characeristic in spite of an "individual wheel control" type of electronic control system on a given one of the vehicle axles.

Referring to FIG. 1, the three axles of a three-axle trailer are identified as 1, 2, and 3. The wheels of the first axle 1 are equipped with speed sensors 4,5 and brake cylinders 8,9. The wheel corresponding to speed sensor 4 is controlled by one channel 19 of a four-channel anti-locking electronic control system 18 that employs the "individual wheel control" principle. The wheel corresponding to the speed sensor 5 is controlled by a channel 20, also employing the "individual wheel control" principle.

The wheels of the second axle 2 are equipped with a respective brake cylinder 10,11, but are not provided with their own wheel sensors. Instead, these wheels are co-controlled on each side of the trailer according to the dynamic condition of the wheel of axle 1 on the corresponding side.

Brake cylinders 8 and 10 are connected by means of a control valve 14 to a fluid pressure supply line 23, which may carry either pneumatic or hydraulic fluid under presure. Similarly, brake cylinders 9 and 11 are also connected to line 23 via another control valve 15. These control valves can be designed to be solenoid operated, or can employ other principles of operation, such as piezo-electric. While shown graphically, these control valves are conventional, having a pressure build-up position in which supply pressure is connected to the brake cylinders, a pressure reduction position in which the brake cylinder pressure is exhausted, and a pressure retention position in which the supply and exhaust are cut off to hold the brake cylinder pressure constant.

Control valve 14 is operated via channel 19 of electronic control system 18, and control valve 15 is operated via channel 20, the control being exercized as a function of the signals emitted by speed sensors 4,5 indicative of the dynamic condition of the respective wheels of axle 1, as a means of allowing the electronic control system 18 to monitor the locking potential of the wheels of axles 1 and 2.

Each wheel of the third axle 3 is also equipped with a respective speed sensor 6,7. The two brake cylinders 12,13 of this third axle 3 are charged jointly via control valves 16,17, which are series-connected in pressure supply line 23. Control valve 16 is operated via the third channel 21 of electronic control system 18, and control valve 17 is operated via the fourth channel 22, the control being exercized as a function of the singals emitted by speed sensors 6 and 7 indicative of the dynamic condition of the respective wheels of axle 3, as a means of allowing electronic control system 18 to monitor the locking potential of the wheels of axle 3.

Figure 2:
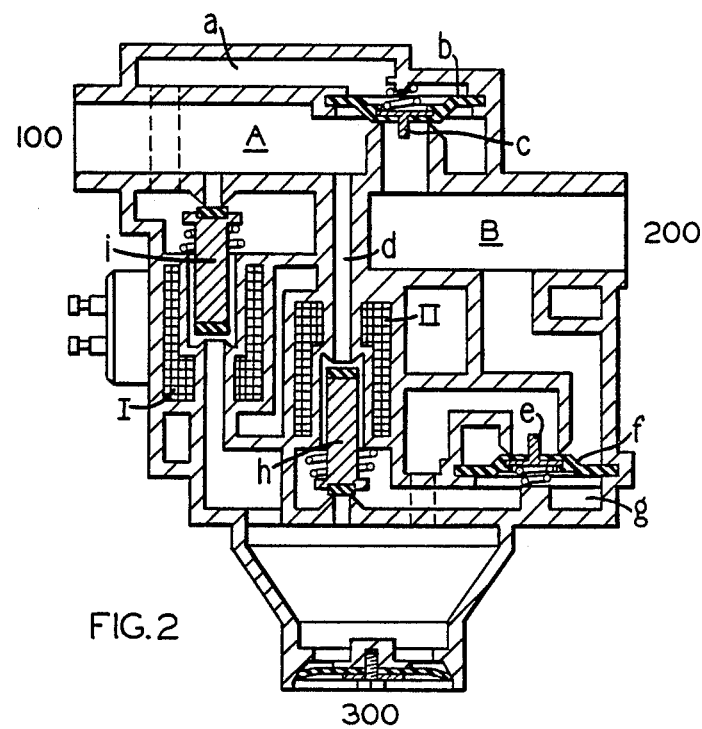
FIG. 2 is a diagrammatic drawing showing a type of regulating valve represented graphically in FIG. 1.

Control valves 16 and 17, shown graphically in FIG. 1, are conventional, but in order to facilitate an understanding of the invention, a diagrammatic showing is provided in FIG. 2. Referring then to FIG. 2, it will be appreciated that these control valves 16 and 17 have a pressure build-up position, a pressure reduction position, and a pressure retention position, similar to control valves 14 and 15.

In the pressure build-up position shown, both solenoid valves I and II are de-energized, so that inlet valve (i) and exhaust valve (h) are closed. The pre-engagement chamber (a) of diaphragm (b) is at atmospheric pressure. Supply pressure from line 23 and effective at inlet port 100 passes from channel (A) through inlet (c) to channel (B) and thence through outlet port (200) to the brake cylinder and simultaneously through drill passage (d) into the pre-engagement chamber (g) of diaphragm (f). Accordingly, exhaust valve (e) is closed, while brake cylinder pressure is being built up.

In the pressure reduction position, solenoid I is energized and valve (i) is opened to channel (A) and closed to exhaust port (300). Thus, the compressed air effective at channel (A) passes into pre-engagement chamber (a), and diaphragm (b) closes inlet (c) to channel (B). Solenoid II is also energized and opens the exhaust from valve (h), so that the compressed air in pre-engagement chamber (g) can escape through exhaust port (300). Diaphragm (f) simultaneously opens exhaust valve (e) allowing air in channel (B) to escape to atmosphere via exhaust port (300).

In the pressure retention position, solenoid I is energized, inlet valve (i) opens, allowing air to pass from channel (A) into pre-engagement chamber (a), and simultaneously through open inlet of valve (h) of the de-energized solenoid II and thence into pre-engagement chamber (g). Accordingly, both diaphragms (b) and (f) close ports (c) and (e), thereby preventing any further increase or decrease of pressure in channel (B) and thus at the brake cylinder.

Of special note is the fact that, in the pressure retention position, if brake pressure in pressure supply line 23 is exhausted, the compressed air effective in pre-engagement chamber (a) is also exhausted via open valve (i), thereby causing diaphragm (b) to unseat valve (c) and allow the presure effective in channel (B) and the brake cylinder outlet port (200) to also vent via channel (A) and inlet port (100).

Referring again to FIG. 1, brake pressure at the respective wheels of axle 1 is controlled in a known manner according to the "individual wheel control" principle, in order to avoid locking of these wheels.

Brake pressure at the respective wheels of axle 2 is, at each side of the trailer, co-controlled in accordance with the brake pressure effective at the respective wheels of axle 1 on a corresponding side of the vehicle. Here, also, locking is generally prevented, since the co-control is exercized on each side of the vehicle. If necessary, pressure relief devices cna be connected ahead of the brake cylinders of axle 2.

The brake pressure at the wheels of the third axle 3, according to the invention is supplied via the series connection of the two control valves 16,17, which achieves a "select-low wheel control" characteristic.

When control valve 16 is operated to a pressure build-up position, while control valve 17 is switched to a pressure reduction position, on account of the potential locking of the wheel associated with valve 17, both brake cylinders of axle 3 are exhausted at valve 17.

Conversely, when control valve 16 is switched to a pressure reduction position, but valve 17 is in its pressure build-up position, both brake cylinders of axle 3 are again exhausted, this time at valve 16. It will be understood, of course, that, if both control valves 16 and 17 are in their pressure reduction position, the brake cylinders of axle 3 are again exhausted.

The supply of fluid under pressure to the brake cylinders of axle 3 can only occur when both control valves are in their pressure build-up position.

When control valve 16 is switched to its pressure retention position, and control valve 17 is in its pressure build-up position, the brake cylinder pressure is held constant. The same result occurs when the respective control valve positions are reversed.

When control valve 16 is switched to its pressure reduction position, but control valve 17 is switched to its pressure retention position, a reduction of brake cylinder pressure still occurs, since in this case, the input pressure at valve 17 is exhausted. As previously explained, valve 17 is designed internally so that instead of the brake cylinder pressure being held constant in the pressure retention position, whenever the inlet pressure is exhausted, brake cylinder pressure is also exhausted with the inlet pressure. If, on the other hand, control valve 16 is switched to a pressure retention position and control valve 17 is set in a pressure reduction position, there is a reduction of brake cylinder pressure in the normal manner.

For satisfactory control by the above-mentioned series connection of the two control valves 16 and 17, the two corresponding control channels 21,22 employ control logic of the "modified individual brake control" type. The series arrangement of control valves 16 and 17 requires that both valves are open in order to establish a connection of supply fluid pressure from line 23 to the brake cylinders of axle 3. Since it is a feature of the above-mentioned "modified individual brake control" logic to establish synchronous operation of the respective control valves 16 and 17 to their pressure build-up position, these control valves will be operable in a series-connected arrangement to provide synchronous re-application of brake pressure during a cycle of wheel slip control.

The apparatus, according to the invention as shown in the drawing, can be applied to the rear axle of a three-axle trailer, or it can be used for the steering axle of a motorized tractor vehicle.

In addition, the invention is applicable in either pneumatic or hydraulic brake systems, or in a hydropneumatic system in which case the brakes are controlled hydraulically and applied pneumatically.

The invention has the advantages of lower steering forces and smaller steering angles during braking when used on a steering axle. when used for the front axle of a trailer, there is a reduction of the drag forces. When used for adherence-linked trailers (see drawing), there is a reduction of the steering movements.

Compared to the prior art known from German Patent No. DE 30 26 254, the invention eliminates the common multi-way valve and its piping, thus making the system more economical, more reliable, and safer.

In the event electronic activation of one of the two control valves 16,17 should fail, valve 16 (for example) remains in the pressure build-up position. In this case, brake cylinder pressure is controlled by control valve 17, which remains operable according to the speed signals received from sensor 6 corresponding to the intact control valve 17. Should valve 17 fail, intact control valve 16 prevails in the same manner.

I claim:

1. An anti-locking brake control system for a motor vehicle having an electronic control unit with at least two control channels assigned for controlling at least two wheels of one axle of the vehicle comprising:
   (a) a brake cylinder for each of said at least two wheels;
   (b) a brake control valve for each of said at least two control channels, said control valves being connected in series to said brake cylinders of said at least two wheels to normally conduct the supply of brake pressure to said brake cylinders;
   (c) each said control valve having a pressure buildup position, a pressure retention position, and a pressure reduction position;
   (d) said control channels having a modified individual control means for limiting the differential of said control channels to a predetermined value; and
   (e) said at least two control channels being effective to operate said control valves synchronously to said pressure buildup position to establish the re-application phase of brake pressure during a cycle of wheel slip control.

2. An anti-locking brake control system, as recited in claim 1, wherein control valves have an inlet port, an outlet port, and an exhaust port, said inlet and outlet ports being communicated and said exhaust port being cut off therefrom in said pressure buildup position, said exhaust and outlet ports being communicated and said inlet port being cut off therefrom in said pressure reduction position, and said outlet port being cut off from said inlet and exhaust ports in said pressure retention position.

3. An anti-locking brake control system, as recited in claim 2, further characterized in that said outlet port of one of said control valves is connected to said inlet port of the other of said control valves and the inlet port of said one control valve is connected to a source of fluid under pressure.

4. An anti-locking brake control system, as recited in claim 3, further characterized in that said outlet port of said other control valve is communicated with said inlet port thereof in response to the fluid pressure at said inlet port thereof being exhausted in said pressure reduction position of said one control valve.

5. An anti-locking brake control system, as recited in claim 4, further characterized in that said outlet port of said other control valve is connectd to each said brake cylinder.

6. An anti-locking brake control system, as recited in claim 5, further comprising sensor means at each of said at least two wheels for providing a speed signal to a respective one of said at least two control channels, in order to monitor the wheel locking potential of said at least two wheels.

* * * * *

UNITED STATES PATENT AND TRADEMARK OFFICE
CERTIFICATE OF CORRECTION

PATENT NO. : 4,740,041
DATED : April 26, 1988
INVENTOR(S) : Helmut Pannbacker

It is certified that error appears in the above-identified patent and that said Letters Patent are hereby corrected as shown below:

Column 6, line 10, after "wherein" insert --said--

Signed and Sealed this

Twenty-fifth Day of October, 1988

Attest:

DONALD J. QUIGG

Attesting Officer

Commissioner of Patents and Trademarks